United States Patent [19]

McGowan et al.

[11] 4,295,494
[45] Oct. 20, 1981

[54] METHOD AND APPARATUS FOR PLUGGING AND CUTTING A GAS LINE OR THE LIKE WITHOUT EXCAVATION

[75] Inventors: John B. McGowan; John Trimble, both of Malvern, Pa.

[73] Assignees: UMAC, Inc., Paoli, Pa.; Brooklyn Union Gas Company, Brooklyn, N.Y.; a part interest to each

[21] Appl. No.: 57,626

[22] Filed: Jul. 16, 1979

[51] Int. Cl.³ .............................................. B22D 19/10
[52] U.S. Cl. ...................................... 138/89; 156/84; 174/DIG. 8; 29/402.12; 264/230; 285/381; 285/DIG. 10; 405/154
[58] Field of Search ......... 138/89; 285/381, DIG. 10; 174/DIG. 8; 29/402.12; 156/84; 405/154; 264/230

[56] References Cited

U.S. PATENT DOCUMENTS

| | | | |
|---|---|---|---|
| 3,243,211 | 3/1966 | Wetmore | 138/178 |
| 3,847,183 | 11/1974 | Meyer | 138/89 |
| 3,900,939 | 8/1975 | Greacen | 138/89 |
| 3,953,059 | 4/1976 | Carroll et al. | 174/DIG. 8 |
| 4,036,514 | 7/1977 | Honnover | 285/DIG. 10 |

*Primary Examiner*—Steven L. Stephan
*Attorney, Agent, or Firm*—Michael F. Petock

[57] ABSTRACT

A method and apparatus of sealing and cutting an underground pipeline, such as a gas line or the like, at or near a point where it connects to a main utilizes an expandable plug which may be inserted in the line without the need to excavate to obtain access to the point of sealing. A thermally stabilized cross-linked preshrunk polyolefin plug is inserted into the line on a heater element. The plug may be inserted from a point where the line exits the earth. Once the plug is inserted on the end of the heater element, the heater element is heated causing the plug to expand fitting it tightly inside of the line at or near the main. The heater element may then be withdrawn, and the line may be cut adjacent the inserted plug.

13 Claims, 5 Drawing Figures

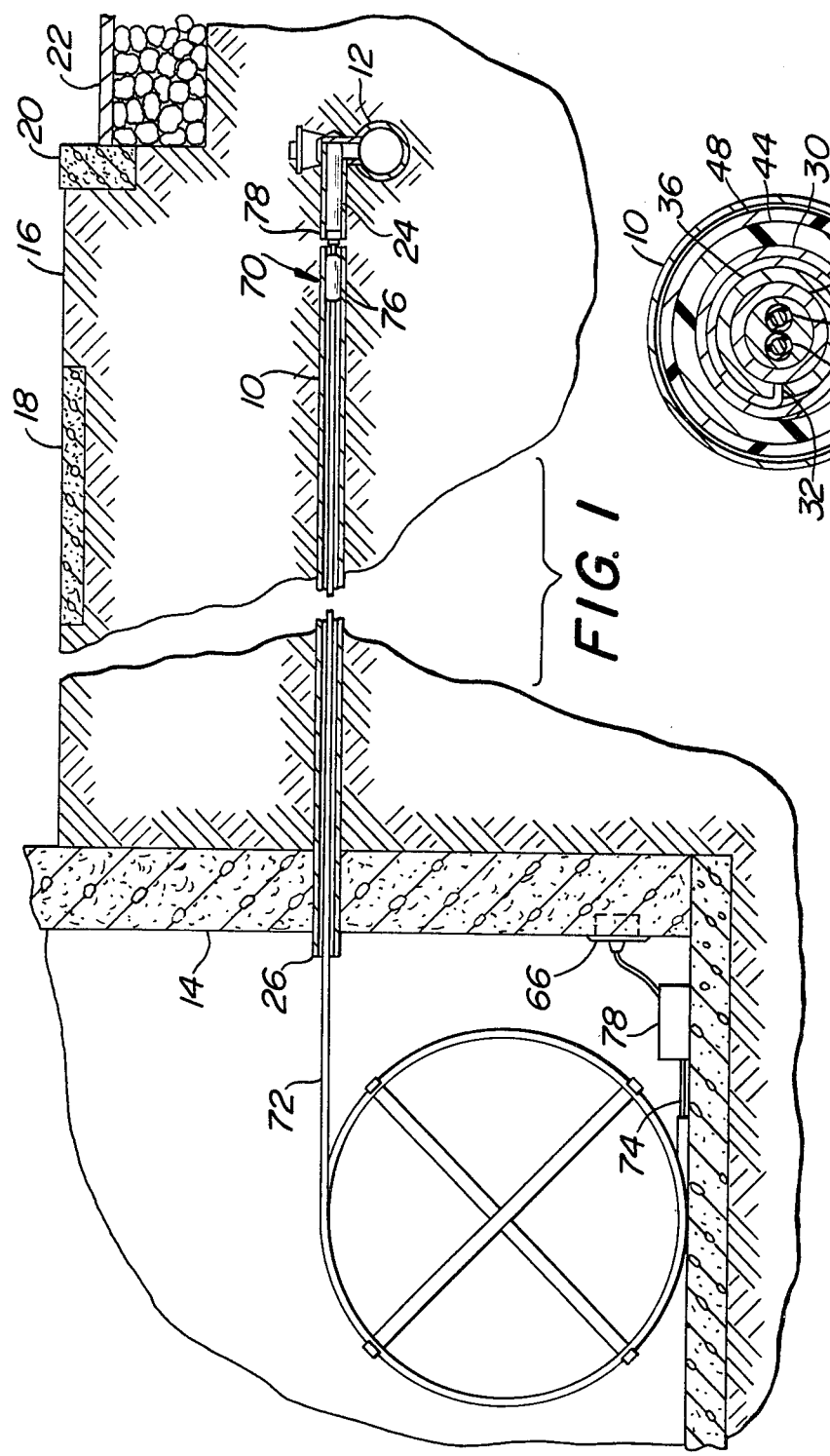

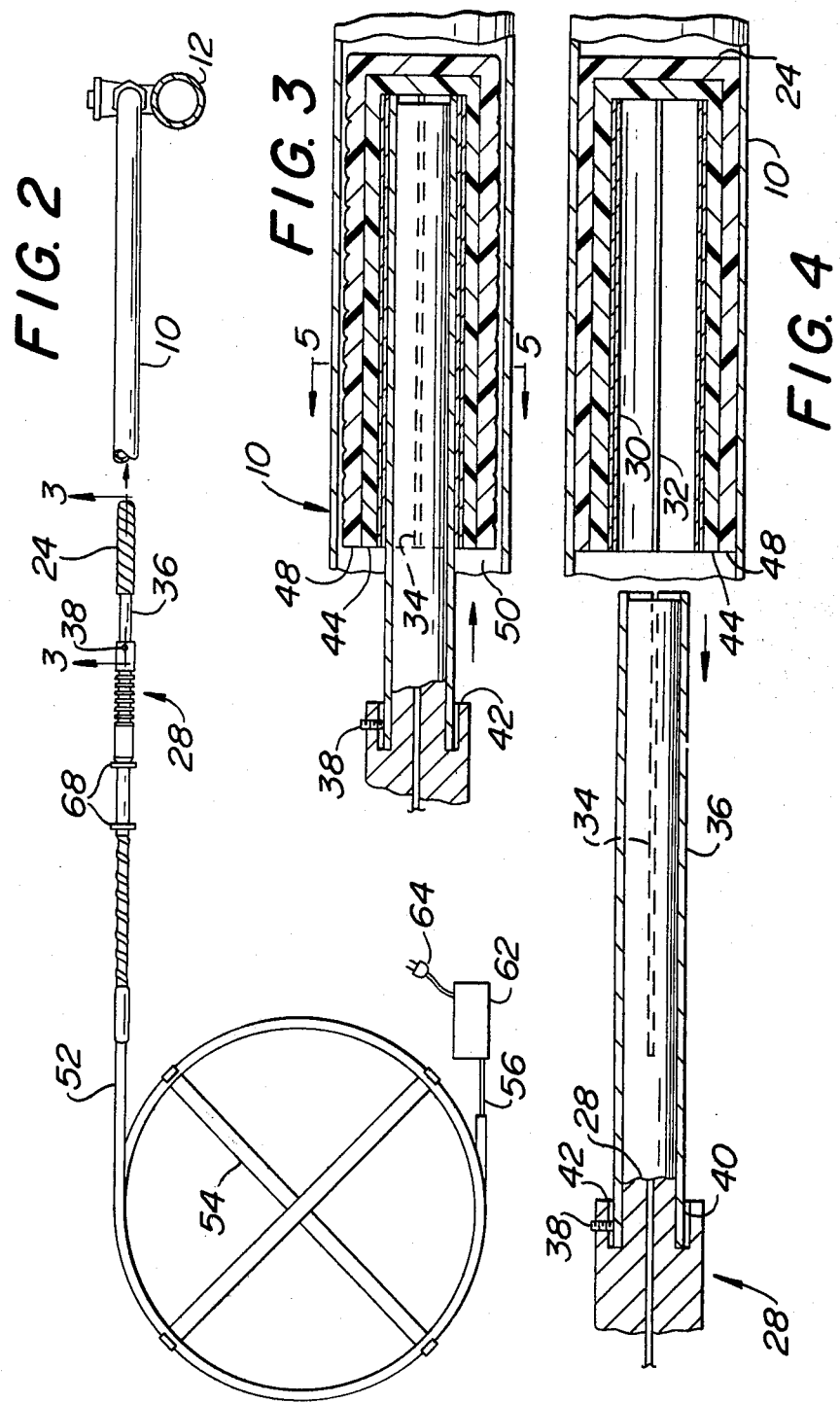

METHOD AND APPARATUS FOR PLUGGING AND CUTTING A GAS LINE OR THE LIKE WITHOUT EXCAVATION

BACKGROUND OF THE INVENTION

The present invention relates to a method of sealing and cutting an underground pipeline or the like at or near the point where it connects to a main without the need for excavation. More particularly, the present invention relates to the insertion of a thermally stabilized cross-linked preshrunk polyolefin plug which is inserted into the line and expanded by heating.

There exists a serious, time consuming and expensive problem in the gas utility industry with respect to the cutting off of gas and the removing of gas lines from premises which have been abandoned. Present federal regulations require the gas line to be plugged at or near the main and the gas line cut when a premise has been abandoned for six months or more. The federal regulations are safety regulations in order to prevent explosions and other possible problems caused by the leaking of gas. Federal regulations not only require the plugging of the line, but also the cutting of the line at or near the gas main after it has been plugged so that future excavations by means of heavy equipment will not rip the line from the gas main causing a substantial gas leak.

The cost to the utilities in terms of time and expense to comply with the federal regulations is very substantial. Prior to the present invention, the gas utility would have to excavate at the point where the gas line connects to the main. This is usually in the street or sidewalk. There is substantial expense in the excavation and then the necessary refilling and repaving operations.

The present invention enables the gas line, or any other similar type of line, to be plugged at or near the main and the line to be cut on the side of the plug away from the main, without the need of excavation.

SUMMARY OF THE INVENTION

The present invention enables the sealing of an underground pipeline, such as a gas line or the like, at or near the point where it connects to a main without having to excavate to obtain access through the pipe at the point where it connects to the main. This results in a substantial cost saving. This is especially important where it is noted that the cutting off of the gas or other similar utility to an abandoned property does not result in the production future income. The substantial expense of excavating, plugging the line, refilling and repaving is a total loss to a utility.

In accordance with the present invention, the underground pipeline may be sealed at or near the point where it connects to the main without the need of excavation by obtaining access to the pipeline at a point where it exits the earth. This point may be in the basement of the abandoned premises. In accordance with the present invention, a thermally stabilized cross-linked preshrunk polymer plug is mounted on a heater element and inserted into the gas line from the point where the gas line exits the earth, such as in the basement. The heater element may be mounted on a flexible elongate shaft having a diameter less than the diameter of the pipe into which it is to be inserted. The plug on the heater element is inserted into the pipeline and positioned at or near the point where the line joins the main. The heating element is then energized, preferably by an electric line running through the flexible elongate shaft, causing the preshrunk cross-linked polymer to expand to its original cross-linked condition sealing the pipe. The heating element may then be withdrawn.

In a preferred embodiment, the elongate shaft is fitted with resilient washers about its circumference so that a substantial amount of gas does not leak from the opening of the gas line where the plug was inserted during the sealing process.

After the plug has been expanded in position, a cutting tool mounted on an elongate flexible shaft may be inserted into the pipeline. The cutting tool is positioned near the inserted plug and energized. The cutting tool cuts the line from the inside of the line. After the line is completely cut, the cutting tool and the elongate flexible shaft are withdrawn from the line and the operation of sealing and cutting the line is complete.

BRIEF DESCRIPTION OF THE DRAWINGS

For the purpose of illustrating the invention, there are shown in the drawings forms which are presently preferred; it being understood, however, that this invention is not limited to the precise arrantements and instrumentalities shown.

FIG. 1 is a cross-sectional elevation view of a plug inserted in a line and the line being cut in accordance with the present invention.

FIG. 2 is an elevation view of a plug mounted on the end of a heater element being inserted into a pipeline in accordance with the present invention.

FIG. 3 is a cross-sectional view taken along the center line of the plug and shown along line 3—3 of FIG. 2, but also showing the plug being inserted in the line which has been broken away in FIG. 2.

FIG. 4 is a detailed cross-sectional view of a plug installed in a line with the heater element and tubular insertion element being withdrawn.

FIG. 5 is a cross-sectional view taken along line 5—5 of FIG. 3 in accordance with the present invention.

DETAILED DESCRIPTION OF THE PREFERRED EMBODIMENTS

Referring now to the drawings in detail wherein like numerals indicate like elements, there is shown in FIG. 1 a line 10 running between a main 12 and the interior of a building wall 14. The line may be any type of a line which is to be sealed and cut without excavation. However, for purposes of illustration, and without intending to be limiting, the invention herein will be described with respect to the plugging and cutting of a gas line running from a gas main. It is understood that other types of lines may be plugged and cut, such as water lines, in accordance with the present invention.

The line 10 and the main 12 are shown buried in the earth 16, as is conventional. A typical sidewalk 18, curb 20 and pavement 22 are shown for illustration purposes.

By means of the present invention, a line 10 may be plugged at or near the main 12 without having to excavate the pavement 22 and/or the curb 20. Excavation and replacement of items such as pavement, curbs and sidewalks is extremely expensive. Even the excavation and refilling of unimproved earth is very expensive.

The present invention may be used with any type of a suitable line 10, such as conventional steel, copper or synthetic pipes. In accordance with the present invention, there is shown in FIG. 1 a plug 24 installed in line 10 at or near the point where line 10 connects with main 12.

In accordance with the present invention, line 10 is cut or opened, such as by removing a fitting, at point 26, which is a point where line 10 exits the earth and is accessable, such as inside the basement of the building from which gas service is being discontinued. A heat expandable plug 24, as shown in FIG. 2, is inserted into line 10 on the end of a heater element 28.

As may be best seen in FIGS. 3, 4 and 5 taken together plug 24 is comprised of a resilient sheet member 30 which may be comprised of stainless spring steel, beryllium copper or other suitable resilient material. Resilient sheet member 30 is provided with an inwardly directing flange 32 along its innermost edge. Flange 32 slidably fits into a slot 34 in tubular insertion element 36. Tubular insertion element 36 is preferably comprised of a good heat conductor, such as copper.

Flange 32 of resilient sheet member 30 is inserted into slot 34 of tubular insertion element 36 and is wrapped tightly around tubular insertion element 36 with the inner end of resilient sheet member 30 being held by flange 32 in slot 34. Preferably, resilient sheet member 32 wraps around tubular insertion element 36 twice. However, it is understood that more or less wraps of resilient sheet member 30 may be wrapped around tubular insertion element 36 depending upon the resilience of the material, the thickness of the material and the desired degree of outwardly directed force to be caused by the coiled resilient sheet member 30.

Preferably, the plugs 24 are manufactured in a form where they are provided to the user mounted on tubular insertion element 36. However, once the plug has been installed in the line, tubular insertion element 36 is preferably withdrawn due to its attachment to the heater element by a locking means such as set screw 38. The rear end 40 of tubular insertion element 36 fits into a slot 42 of heater element 28 where it is locked by set screw 38 or other suitable locking means.

Formed on the outside of resilient sheet member 30 is a layer of thermally stabilized cross-linked preshrunk polymer 44. The thermally stabilized cross-linked layer of polymer may preferably be cross-linked polyolefin such as thermally stabilized cross-linked preshrunk polyethylene, although it is understood that other cross-linked polymers may be used, such as cross-linked polyvinyl chlorides, ABS (acrylonitrile-butadiene-styrene copolymers), polyurethanes, most rubbers, and/or polyolefins with a metal ion added such as that commercially available from E.I. duPont de Nemours & Co. under the trademark "SURLYN". Although the term cross-linked polyolefin or polyethylene may be used herein as specific examples of preferred embodiments, it is understood that other cross-linked polymers may be used in practicing the present invention. The cross-linking of the polyolefin may be performed by ultra-violet light, chemical means such as the use of dicumal peroxide or by radiation. As is known in the art, cross-linked polyolefin or other thermally stabilized polymer tends to return to its size or condition at which is was cross-linked. In accordance with the present invention, cross-linked polymer tubing, such as cross-linked polyethylene tubing, may be heated and stretched to reduce its radial dimension. The stretched cross-linked polymer may then be used to form layer 44 of the plugs 24 in accordance with the present invention. Upon reheating of the plug 24, by means of heater 28, when it is inserted in the desired position in the line, cross-linked polymer layer 44 tends to expand back to its normal cross-linked condition. This expansion causes an expansion of the plug in the line causing it to become fixed firmly in place.

Outside of layer 44 of plug 24, there is provided a relatively soft outer tacky surface layer 48 that will bond to the inner surface 50 of line 10. Layer 48 may be comprised of a mastic which is agressive in its ability to stick to the inner surface 50 of the line 10. Layer 48 need not form a chemical or molecular bond with the line 10, but a strong mechanical bond with the inner surface 50 of line 10 is sufficient when formed by an aggressive sticky mastic. The resilient sheet member 30 provides a radially outward force on layers 44 and 48 helping the polymer layer 44 to expand when heated and providing reinforcement for layers 44 and 48 thereby insuring a long plug life for plug 24 when inserted into a line.

In inserting plug 24 into a line 10, plug 24, which is preferably already attached to a tubular insertion element 36, is slid over a heater element 28 with rear end 40 of tubular insertion element 36 inserted in slot 42 of heater element 28. Set screw 38, or other suitable locking means, is tightened to lock tubular insertion element 36 to heater element 28. Heater element 28 is attached to an elongate flexible tubular shaft 52. Flexible tubular shaft 52 has sufficient rigidity to enable the pushing of plug 24 along the inside of the line for considerable distances. The present invention may be used to insert a plug in a line at distances up to 150 feet from the point of insertion. However, even greater distances may be achieved. Tubular element 52 may be coiled on a holding stand 54 as shown. Preferably, an electric cable 56 runs through the center of tubular shaft 52 supplying electric power for heating elements 58 and 60 (shown in FIG. 5) of heater element 28. Electric cable 56 is connected at its opposite end to an electrical controller 62 which may be used to regulate the current in heater elements 58 and 60 to control the temperature as is well known in the art. Electric controller 62 may be connected by means of plug 64 to any convenient receptacle, such as receptacle 66 shown in FIG. 1 for illustration purposes.

Several washers 68 are preferably provided on shaft 52, preferably immediately behind heater element 68. Washers 68 are selected to fit snugly to the inside wall of line 10 thereby substantially preventing the loss of fluid, such as gas, during the time that line 10 is opened at point 26 and plug 24 is being inserted on the front end of heater element 28 on shaft 52.

Once plug 24 on heater element 28 is inserted in line 10 to a position substantially at or near main 12, controller 62 is energized causing the controlled heating of plug 24 by means of heater 28. When plug 24 is heated, the polyolefin expands causing the plug to become tightly lodged within line 10 at the desired location. Controller 62 is then turned off, and the plug is allowed to cool. Shaft 52, with heater element 28 and tubular insertion element 36 is then withdrawn back through line 10 and out of opening 26.

In accordance with a preferred method of the present invention, a cutting device 70 mounted on the end of a flexible tubular shaft 72 is inserted into the line to a point substantially adjacent plug 24. Tubular shaft 72 may be similar to flexible tubular shaft 52 and both of these shafts may be made out of any suitable flexible material which has a pre-determined degree of rigidity. In a preferred embodiment, fiberglas tubing has been used. Flexible tubular shaft 72 is provided with an electric cord 74 running therethrough which supplies electrical power to motor 76 of cutter 70. The power to motor 76 is supplied by electrical controller 78, which may be plugged into a receptacle. Cutter 70 is provided with retractable or foldable blades which may be retracted or folded for insertion into the line, extended for cutting, and then again retracted for withdrawal of cutter 70 from the line. In this manner, the line 10 may be cut immediately behind the inserted plug 24 thereby completing the process of plugging the line and cutting the line without the need for excavation. The cutting of the line prevents damage to the main 12 and the connection to the main 12 in the possibility that line 10 is contacted or ripped up by future excavation, such as by operation of a backhoe.

In summary, the present invention comprises the method and apparatus for plugging and sealing an underground line without having to excavate to obtain access to the line. The plugging and cutting of the line are done at a substantial distance from the building, at or near the point where the line joins a main. This distance may be at a substantial distance from an access point to the line. The plugs are preferably constructed on a slitted tubular insertion element. The tubular insertion element, which is of a heat conductive material, is installed and locked to the end of a heater element. The heater element is inserted by means of an elongate flexible shaft having electrical connections running therethrough. The elongate flexible shaft is also provided with sealing means to prevent the loss of gas or other fluid back through the line while the plug is being inserted and installed in place. Once the plug is installed in place, preferably at or near the main, the flexible elongate shaft is withdrawn along with the heater element and the attached tubular insertion element. The plug remains in place and acts as a seal for extended periods of time. The plug is reinforced by a resilient sheet spring member. Once the plug is installed, the cutter element is inserted in the line in a similar manner and the line is cut immediately adjacent to and behind the installed plug. The cutter element is then withdrawn and the operation has been completed without the need for expensive and time consuming excavation and back filling operations.

The present invention may be embodied in other specific forms without departing from the spirit or essential attributes thereof and, accordingly, reference should be made to the appended claims, rather than to the foregoing specification as indicating the scope of the invention.

We claim:

1. A method of sealing an underground pipeline or the like at or near the point where it connects to a main without excavation to obtain access to the pipe, comprising the steps of:
   obtaining access to the underground pipe at a point beyond where it exits the earth:
   mounting a thermally stabilized cross-linked preshrunk plug on a heater element, said heater element being mounted on a flexible elongate shaft having a diameter less than the diameter of the pipe, said shaft having sufficient rigidity to push said heating element through said line and sufficient flexibility to bend with curves in the line, said shaft being provided with electrical conductors passing longitudinally therethrough;
   inserting said plug into said underground pipeline by feeding said flexible elongate shaft with said heater element mounted thereon into said underground pipeline;
   positioning said plug into said line at or near said main by feeding said elongate flexible shaft into said line;
   energizing said heating element by applying electrical energy to said electrical conductors causing said preshrunk cross-linked plug to expand to its cross-linked condition sealing said pipe; and
   withdrawing said heater element and said shaft.

2. A method of sealing an underground gas pipeline or the like as set forth in claim 1 including the steps of:
   inserting a cutting tool mounted on an elongate flexible shaft into said pipeline;
   positioning said cutting tool by feeding said shaft in a position adjacent said installed plug;
   energizing said cutting tool to cut said pipe; and
   removing said cutting tool and said shaft.

3. Apparatus for sealing an underground gas pipeline or the like at or near the point where it connects to a main without excavation to obtain access to the pipe, comprising:
   a heat conductive tubular element adapted to fit over a heating element;
   a resilient sheet member coiled about at least a portion of said tubular member providing a radially outward force;
   a layer of thermally stabilized cross-linked material mounted over said resilient sheet member, said material having been preshrunk after cross-linking to form a small diameter tubular plug wherein said material will expand to its cross-linked condition upon being heated;
   a layer of bonding material mounted over said cross-linked material providing a bonding material between said material and said underground pipeline; and
   a heating element mounted on one end of an elongate flexible shaft, said heating element being adapted to fit into said tubular element, said shaft having sufficient rigidity to push said heating element through said underground pipe and sufficient flexibility to bend with curves in said underground pipe, said elongate flexible shaft being provided with electrical conductors passing longitudinally therethrough and connected to said heating element for energization of said heating element.

4. Apparatus for sealing an underground gas pipeline or the like in accordance with claim 3 wherein said heating element is comprised of a cylindrical heating element adapted to fit into said tubular member, and is provided with means for locking said tubular member to said heating element.

5. Apparatus for sealing an underground gas pipeline or the like in accordance with claim 4 wherein said tubular element is removable from the inside of said resilient sheet member after said cross-linked layer has been expanded in the line.

6. Apparatus for sealing an underground gas pipeline or the like in accordance with claim 3 wherein said shaft is comprised of fiberglass.

7. Apparatus for sealing an underground gas pipeline or the like in accordance with claim 3 wherein said shaft is hollow.

8. Apparatus for sealing an underground gas pipeline or the like in accordance with claim 3 wherein said shaft is provided with one or more resilient washers fitted to the outer surface of said shaft behind said heating element, said resilient washers providing a tight fit with the inner wall of the line whereby gas from the line is substantially prevented from escaping from the open end of the pipeline where the plug was initially inserted.

9. Apparatus for sealing an underground gas pipeline or the like in accordance with claim 3 wherein said heating element is electrically operated and including electrical control circuitry for controlling the temperature of said heating element.

10. Apparatus for sealing an underground gas pipeline or the like in accordance with claim 7 wherein an electrical cable for connecting an electrical heating element to an electrical control circuit is run through the hollow center of said shaft.

11. Apparatus for sealing an underground gas pipeline or the like in accordance with claim 3 wherein said resilient sheet member is provided with a radially inwardly directed flange formed longitudinally along its innermost end, said flange being fitted into a longitudinal slit in said tubular element.

12. Apparatus for sealing an underground gas pipeline or the like in accordance with claim 3 wherein said material is thermally stabilized cross-linked polyolefin.

13. Apparatus for sealing an underground gas pipeline or the like in accordance with claim 12 wherein said polyolefin is thermally stabilized cross-linked polyethylene.

* * * * *